(12) United States Patent
Sakellariadis et al.

(10) Patent No.: US 12,175,112 B2
(45) Date of Patent: *Dec. 24, 2024

(54) GLOBAL HETEROGENEOUS DATA MIRRORING

(71) Applicant: Stripe, Inc., San Francisco, CA (US)

(72) Inventors: Sophia Chrisoula Sakellariadis, San Francisco, CA (US); Anand Balaji, San Francisco, CA (US)

(73) Assignee: Stripe, Inc., South San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/217,191

(22) Filed: Jun. 30, 2023

(65) Prior Publication Data
US 2023/0350596 A1   Nov. 2, 2023

Related U.S. Application Data

(63) Continuation of application No. 16/715,862, filed on Dec. 16, 2019, now Pat. No. 11,755,228.

(51) Int. Cl.
*G06F 3/06* (2006.01)
*G06F 9/30* (2018.01)
(Continued)

(52) U.S. Cl.
CPC ............ *G06F 3/065* (2013.01); *G06F 3/0622* (2013.01); *G06F 3/067* (2013.01);
(Continued)

(58) Field of Classification Search
CPC ........ G06F 3/065; G06F 3/0622; G06F 3/067; G06F 9/30043; G06F 9/466;
(Continued)

(56) References Cited

U.S. PATENT DOCUMENTS

| 2005/0198074 A1 | 9/2005 | Khayter et al. |
| 2011/0183748 A1* | 7/2011 | Wilson ................ G07F 17/3241 463/25 |

(Continued)

FOREIGN PATENT DOCUMENTS

JP   2004302919 A   10/2004

OTHER PUBLICATIONS

International Preliminary Report and Written Opinion on the Patentability of international application PCT/US2020/063685 dated Jun. 30, 2022, 7 pages.

(Continued)

*Primary Examiner* — David Yi
*Assistant Examiner* — Zubair Ahmed
(74) *Attorney, Agent, or Firm* — BAKERHOSTETLER

(57) ABSTRACT

A method and apparatus for data mirroring are described. In one embodiment, a method for implementing country-specific data locality to cause data related to local transactions to be stored within the country in which the transactions occurred, comprises: capturing a set of transaction data associated with a set of transactions into a first cloud-based storage resource; and, according to a configuration file, performing data mirroring across a heterogeneous set of cloud providers using a plurality of stages executed by one or more processors.

20 Claims, 7 Drawing Sheets

(51) Int. Cl.
*G06F 9/46* (2006.01)
*H04L 9/08* (2006.01)

(52) U.S. Cl.
CPC .......... *G06F 9/30043* (2013.01); *G06F 9/466* (2013.01); *H04L 9/0838* (2013.01)

(58) Field of Classification Search
CPC ............. G06F 21/6218; H04L 67/1095; H04L 67/1097; H04L 67/52; H04L 63/0428; H04L 63/166; H04L 9/0838; G06Q 20/4015
USPC .................................................. 711/154, 100
See application file for complete search history.

(56) References Cited

U.S. PATENT DOCUMENTS

| | | | |
|---|---|---|---|
| 2012/0110044 A1* | 5/2012 | Nagpal | G06F 16/27 707/827 |
| 2014/0337847 A1 | 11/2014 | Klein | |
| 2018/0056179 A1* | 3/2018 | Rose | G06Q 20/127 |
| 2018/0137015 A1 | 5/2018 | Boshev et al. | |
| 2018/0196832 A1* | 7/2018 | Maybee | G06F 11/1004 |
| 2019/0286330 A1 | 9/2019 | Varadharajan et al. | |
| 2019/0354713 A1 | 11/2019 | Surla | |

OTHER PUBLICATIONS

International Search Report and Written Opinion on the Patentability of Application PCT/US2020/063685 dated Apr. 7, 2021, 10 pages.

* cited by examiner

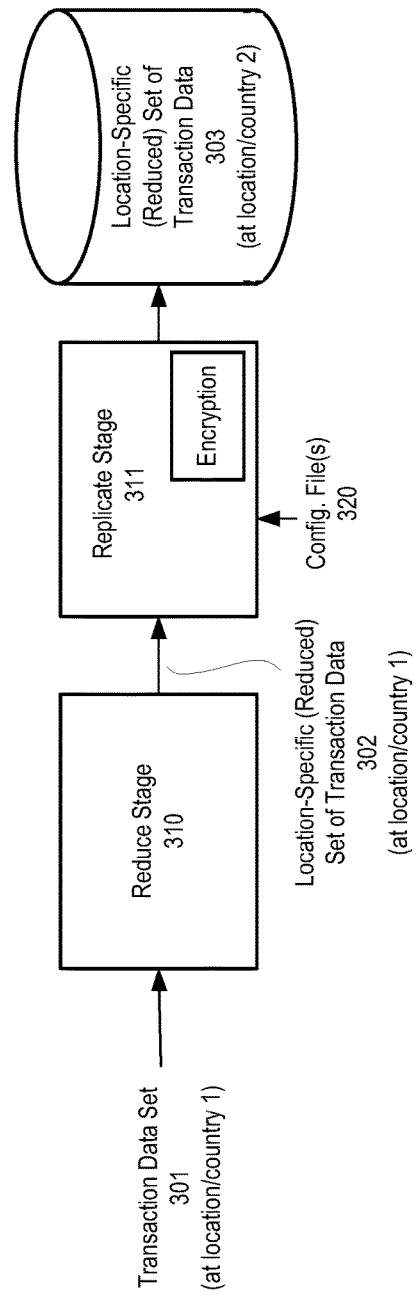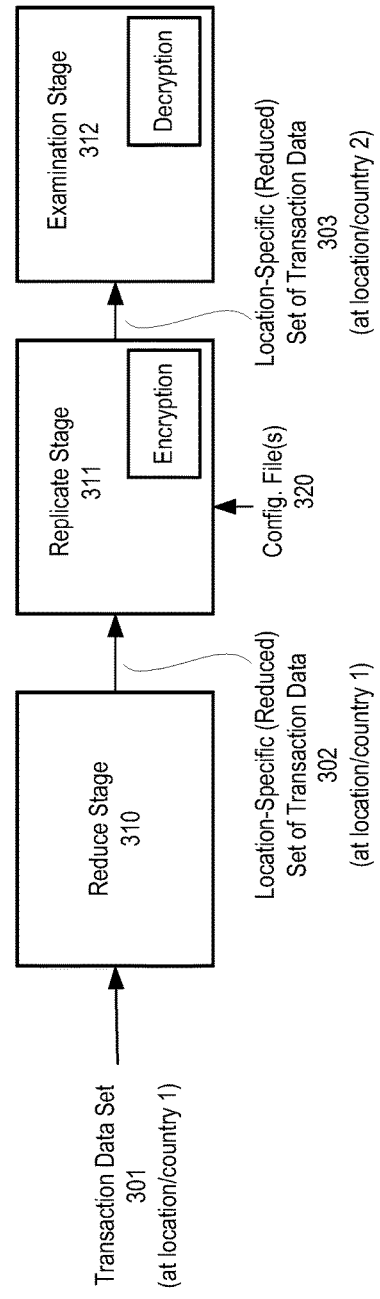

Capture a set of transaction data associated with payment processing transactions into a first public cloud storage
(601)

Perform data mirroring across a heterogeneous set of cloud providers using a pipeline having a plurality of pipeline stages executed by one or more processors, the plurality of pipeline stages including a first stage to filter a set of transaction data stored in the first public cloud storage resource according to a configuration file of the first public cloud storage resource that specifies filter criteria to create a reduced set of data, from the set of transaction data, that contains data associated with each transaction related to a location specified in the filter criteria and to write the reduced set of data to a target public cloud storage resource specified as an output destination in the configuration file at the location; a replication stage to monitor the target public cloud storage resource and perform a replication task to mirror the reduced data set to a remote cloud-based storage location defined in the configuration file for the target public cloud storage resource, including encrypting data prior to mirroring of the data to the remote cloud-based storage location according to an encryption policy in the configuration file of the target public cloud storage resource and performing a key exchange with another party (e.g., regulatory entity) for decryption, where the remote cloud-based storage location is in a first country different than a second country in which the first public cloud storage resource resides; and an examine stage to enable access to the mirrored data at the remote cloud-based storage location, including optionally providing secure server (e.g., FTP server) access to the mirrored data and decrypting encrypted transaction data
(602)

FIG. 6

GLOBAL HETEROGENEOUS DATA MIRRORING

RELATED APPLICATIONS

This application is a continuation of U.S. patent application Ser. No. 16/715,862, filed Dec. 16, 2019. The disclosure of the aforementioned application is incorporated by reference herein in its entirety.

COPYRIGHT NOTICE AND AUTHORIZATION

Portions of the documentation in this patent document contain material that is subject to copyright protection. The copyright owner has no objection to the facsimile reproduction by anyone of the patent document or the patent disclosure as it appears in the Patent and Trademark Office file or records, but otherwise reserves all copyright rights whatsoever.

FIELD OF THE INVENTION

Embodiments of the present invention relate to the field of systems for processing commercial transactions; more particularly, embodiments of the present invention relate to mirroring transaction data to one or more locations that use cloud-based storage arrangements.

BACKGROUND OF THE INVENTION

Today, many merchants use third parties to handle all their payment processing needs for commercial transactions. In some cases, the merchants redirect their customers to the third party, who is responsible for capturing the payment information and processing the transaction, or the merchants capture payment information themselves from their customers and send it to a third-party payment gateway for real-time authorization of transactions and subsequent settlement of funds.

Transaction tracking software is often used to track transactions and store data related to the transactions. Data associates with the commercial transactions are usually stored to enable one or more parties to access the transaction data for tracking and/or audit purposes. The storage is often in cloud-based storage that is accessible over a network such as, for example, the Internet. In this way, the data associated with commercial transactions of a merchant are stored and can be accessed by the merchant or other permissible parties through the Internet. A number of different cloud-based storage providers may be used to store the transaction data, such as, for example, but not limited to, Amazon Web Services (AWS), Google Compute, AliCloud, etc.

To participate in Asia-Pacific region (APAC), and South East Asia Regional (SEA) in particular, a number of local governments have introduced data locality legislation requiring that, among other things, some portion of data for local transactions be stored within the country. However, if the cloud provider that is being used to store data for such local transactions is not available in a region, this causes problems. In such a case, the transaction tracking software must support additional cloud providers (e.g., must support Google Compute, AliCloud, etc. in a case when AWS is not supported).

SUMMARY

A method and apparatus for data mirroring are described. In one embodiment, a method for implementing country-specific data locality to cause data related to local transactions to be stored within the country in which the transactions occurred, comprises: capturing a set of transaction data associated with payment processing transactions into a first public cloud storage resource; and performing data mirroring across a heterogeneous set of cloud providers using a pipeline having a plurality of pipeline stages executed by one or more processors, the plurality of pipeline stages including a first stage to filter a set of transaction data stored in the first public cloud storage resource according to a configuration file of the first public cloud storage resource that specifies filter criteria to create a reduced set of data, from the set of transaction data, that contains data associated with each transaction related to a location specified in the filter criteria and to write the reduced set of data to a target public cloud storage resource specified as an output destination in the configuration file at the location; and a replication stage to monitor the target public cloud storage resource and perform a replication task to mirror the reduced data set to a remote cloud-based storage location defined in the configuration file for the target public cloud storage resource, the remote cloud-based storage location being in a first country different than a second country in which the first public cloud storage resource resides.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

FIG. 3A is a block diagram of one embodiment of a data mirroring pipeline.

FIG. 3B is a block diagram of another embodiment of a data mirroring pipeline.

FIG. 6 is a flow diagram of one embodiment of a process for mirroring data in a global environment.

DETAILED DESCRIPTION

Figure 1:
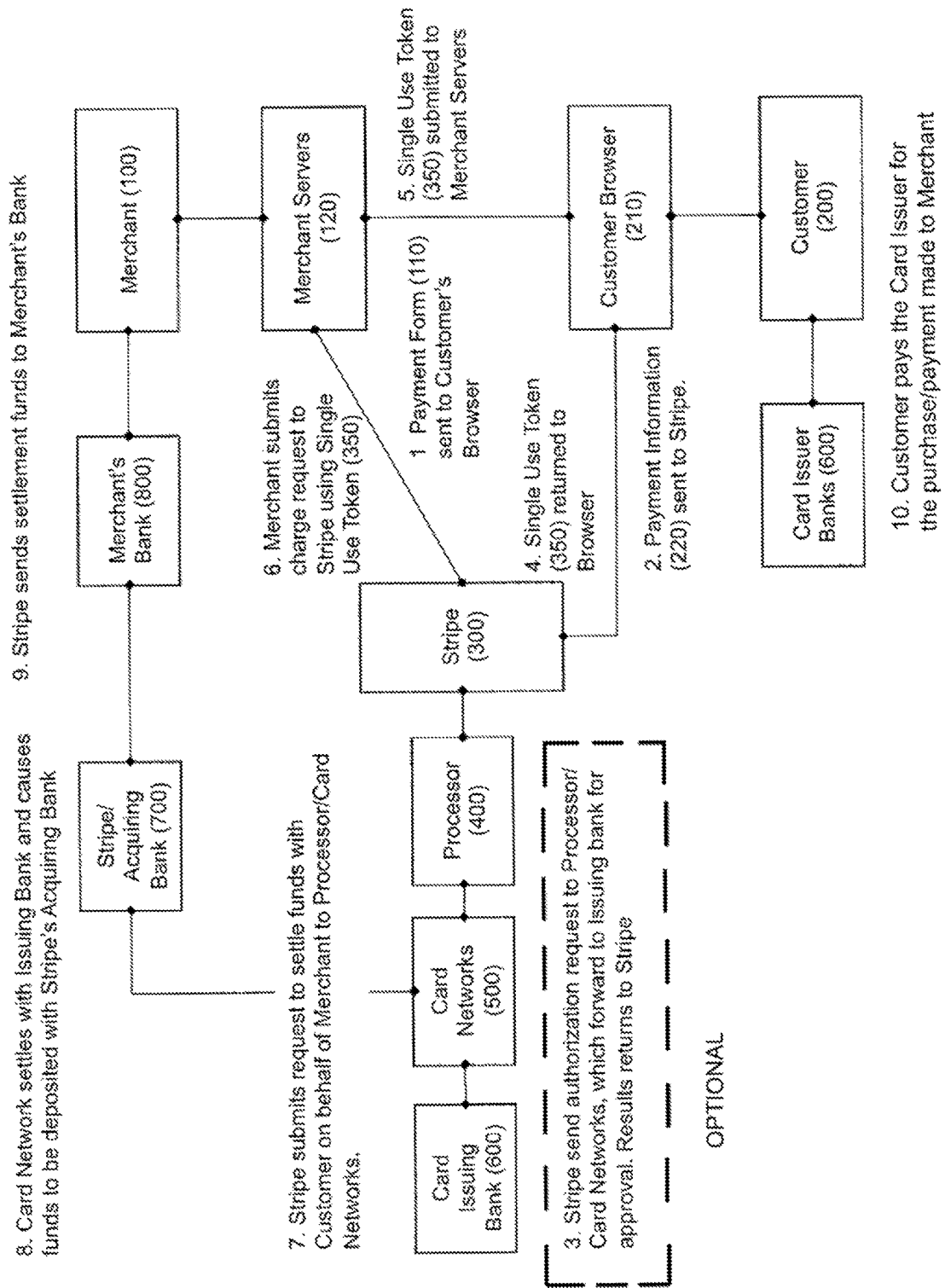
FIG. 1 shows a flow diagram of the steps and entities for implementing payment processing.

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Certain terminology is used herein for convenience only and is not to be taken as a limitation on the present invention.

Embodiments of the present invention is described in the context of an online payment acceptance service called Stripe® commercialized by Stripe, Inc., San Francisco, California.

The following definitions are provided to promote understanding of the present invention.

Card Network (or Card Association)—refers to financial payment networks such as Visa®, MasterCard®, American Express®, Diners Club®, JCB® and China UnionPay®.

Processor—A processor is a company (often a third party) appointed to handle credit card transactions. They have connections to various card networks and supply authorization and settlement services to merchants or payment service providers. They can also move the money from the issuing bank to the merchant or acquiring bank.

Acquiring Bank—An acquiring bank (or acquirer) is the bank or financial institution that accepts credit and or debit card payments from affiliated card networks for products or services on behalf of a merchant or payment service provider.

Card Issuing Bank—A card issuing bank is a bank that offers card network or association branded payment cards directly to consumers. The issuing bank assumes primary liability for the consumer's capacity to pay off debts they incur with their card.

Payment Information—In one embodiment for making payment via a credit card or debit card, the payment information includes primary account number (PAN) or credit card number, card validation code, expiration month and year. In another embodiment for making payment via an Automated Clearinghouse (ACH) transaction, the payment information includes a bank routing number and an account number within that bank. The payment information includes at least some sensitive, non-public information.

Merchant—A merchant, as used herein, is an entity that is associated with selling or licensing products and/or services over electronic systems such as the Internet and other computer networks. The merchant may be the direct seller/licensor, or the merchant may be an agent for a direct seller/licensor. For example, entities such as Amazon® sometimes act as the direct seller/licensor, and sometimes act as an agent for a direct seller/licensor.

Merchant Site—The merchant site is the e-commerce site (e.g., website) of the merchant. The merchant (100) and merchant server (120) in the figures are associated with the merchant site. The merchant site is associated with a client-side (client side) application and a server-side (server side) application. In one embodiment, the merchant site includes Merchant Server (120), and the server-side application executes on the Merchant Server (120).

Customer's Electronic Device—This is the device that the customer uses to interact with the merchant. Examples of this device include a desktop computer, a laptop computer, a mobile device (e.g., smartphone, tablet) and game console. The customer's electronic device may interact with the merchant via a browser application that executes on the device, or via a native application (app) installed onto the customer's device. The client-side application executes on the customer's electronic device.

Payment Processor—A payment processor, as referred to herein, is an entity or a plurality of entities that facilitate a transaction between a merchant site and a customer's electronic device. The payment processor includes selected functionality of both Stripe (300) and Processor (400)/Card Networks (500). For example, in one embodiment, Stripe (300) creates tokens and maintains and verifies publishable (non-secret) keys and secret keys in a manner well-known in the art. See for example, U.S. Pat. Nos. 10,134,036, 9,830, 596, and 9,824,354. The Processor (400)/Card Networks (500) is involved in authorizing or validating payment information. In one embodiment, Stripe (300) and the Processor (400)/Card Networks (500) function together to authorize and validate payment information, issue a token, and settle any charges that are made. Accordingly, in one embodiment, the payment processor refers to the functionality of Stripe (300) and the functionality of the Processor (400)/Card Networks (500). In another preferred embodiment wherein step 3A in the high-level description is not performed, and Stripe (300) performs its own verification before issuing a token, the Processor (400)/Card Networks (500) are still used for settling any charges that are made, as described in step 7A in the high-level description. Accordingly, in this embodiment, the payment processor may refer only to the functionality of Stripe (300) with respect to issuing tokens.

Native Application—A Native Application or "native app" is an application commonly used with a mobile device, such as a smartphone or tablet. When used with a mobile device, the native app is installed directly onto the mobile device. Mobile device users typically obtain these apps through an online store or marketplace, such as an app store (e.g., Apple's App Store, Google Play store). More generically, a native application is designed to run in the computer environment (machine language and operating system) that it is being run in. It can be referred to as a locally installed application. A native application differs from an interpreted application, such as a Java applet, which requires interpreter software. A native application also differs from an emulated application that is written for a different platform and converted in real-time to run, and also differs from a Web application that is run within the browser.

Overview

Techniques are disclosed herein for handling transactions involving payment flows in which data from transactions is tracked and mirrored to other locations. In one embodiment, the techniques disclosed herein enable a payment processing infrastructure to store transaction data in a cloud-based storage and have it mirrored automatically to one or more other different locations (e.g., one or more different countries), regardless of the cloud-based storage used at the locations to which the mirrored data is to be stored.

FIG. 1 shows a flow diagram of the steps and entities for implementing payment processing flow embodiments of the present invention.

At a high level, the payment processing framework described herein works as follows (FIG. 1):

1. A Merchant's Customer (200) uses an internet-enabled browser (210) to visit the Merchant's site. In one embodiment, Customer (200) is served a Stripe.js enabled Payment Form (110) using standard web technologies. Stripe.js is well-known in the art. For more information on Stripe.js, see U.S. Pat. Nos. 10,134,036, 9,830,596, and 9,824,354. The Customer (200) enters the necessary information including their Payment Information (220) and submits the Payment Form (110). The Billing Info portion of the Payment Form (110) is for payment via a credit card or debit card. If payment is to be made via an Automated Clearinghouse (ACH) transaction, the Billing Info portion of the Payment Form (110) will request a bank routing number and an account number within that bank, and possibly additional information, such as the bank name and whether the account is a checking or savings account.

2. The Customer's payment information (220) is sent from the Customer's browser (210) to Stripe (300), never touching the Merchant's Servers (120). In this manner, the client-side application electronically sends payment information retrieved from the customer's electronic device to the payment processor. The client-side application does not send the payment information (220) to the server-side application.

3. In one embodiment, Stripe (300) submits the relevant transaction to a Processor (400) or directly to the Card Network (500) for authorization or validation of the payment information. The Card Network (500) sends the request to the Card Issuing Bank (600), which authorizes the transaction. In this embodiment, Stripe (300) and Processor (400)/Card Network (500) function together as a payment processor. In another embodiment, this step is performed without any communication to the Processor (400)/Card Network (500). Instead, Stripe (300) performs its own authorization or validation of the payment information using heuristic means, such as by checking the Bank Identification Number (BIN), also referred to as the Issuer Identification Number (IIN), against a database of known valid BINs that is on file with Stripe (300). (The BIN is a part of the bank card number, namely the first six digits.) In yet another embodiment, this step is not performed at all since the authorization or validation is not necessary for the next step 4 to succeed. That is, it is acceptable to create a Single-use Token in step 4A that represents payment information which has not been validated in any way.

4. If authorized, Stripe (300) will generate and return a secure, Single-use Token (350) to the Customer's Browser (210) that represents the customer's payment information (220) but doesn't leak any sensitive information. In the embodiment wherein step A3 is not performed, Stripe (300) performs this step without waiting to receive authorization from the Processor (400) or the Card Network (500). In this manner, the payment processor (here, Stripe (300)) creates the Token (350) from the payment information sent by the client-side application, wherein the Token (350) functions as a proxy for the payment information (220).

5. The Payment Form (110) is submitted to Merchant's Servers (120), including the Single-use Token (350). More specifically, the payment processor sends the Token (350) to the client-side application, which, in turn, sends the Token (350) to the server-side application for use by the server-side application in conducting the transaction.

6. The Merchant (100) uses the Single-use Token (350) to submit a charge request to Stripe (or to create a Customer object for later use). In this step, Stripe (300) submits a request to authorize the charge to the Processor (400) or directly to the Card Network (500). This authorization specifies the actual amount to charge the credit card. If an authorization was already done in step 3A for the correct amount, this authorization request can be skipped. This may be a one-time payment for a merchant item, or it may involve registering the payment information with the merchant site for subsequent use in making a payment for a merchant item (so-called "card on file" scenario). Using the process described in steps 1-6, the payment information can be used by the server-side application via the Token (350) without the server-side application being exposed to the payment information.

7. Stripe (300) settles the charge on behalf of the Merchant (100) with the Processor (400) or directly with the Card Network (500).

8. The Card Network (500) causes the funds to be paid by the Card Issuing Bank (600) to Stripe (300) or to Stripe's Acquiring Bank (700).

9. Stripe (300) causes the settled funds to be sent to the Service Provider (100) (or to the Merchant's Bank (800)), net of any applicable fees.

10A. The Card Issuing Bank (600) collects the paid funds from the Customer (200).

Data Mirroring

In one embodiment, the platform described above stores data related to the transactions processed or otherwise handled by the payment processor (e.g., Stripe) for its customers (e.g., merchants, service providers, etc.) and a portion of the stored transaction data is also mirrored (and stored) in another location (e.g., a different country than the country in which the full set of transaction data resides). That is, a copy of the transaction data is extracted from storage and stored in another location. In one embodiment, the extracted transaction data is for transactions of merchants in a given country and the extracted data is stored at a location in that given country. This may be done to adhere to regulatory requirements of a regulatory body, and its regulators, in a particular country to enable the transaction data to be audited and reviewed. Thus, data corresponding to transactions that occurred at least in part in one country is replicated to data storage in or accessible from within the one country. In one embodiment, the storage used to store the transaction data is a database in a cloud-based storage that is maintained by a cloud-based storage provider (e.g., AWS, Amazon Web Services (AWS), Google Compute, AliCloud, etc.).

Figure 2:
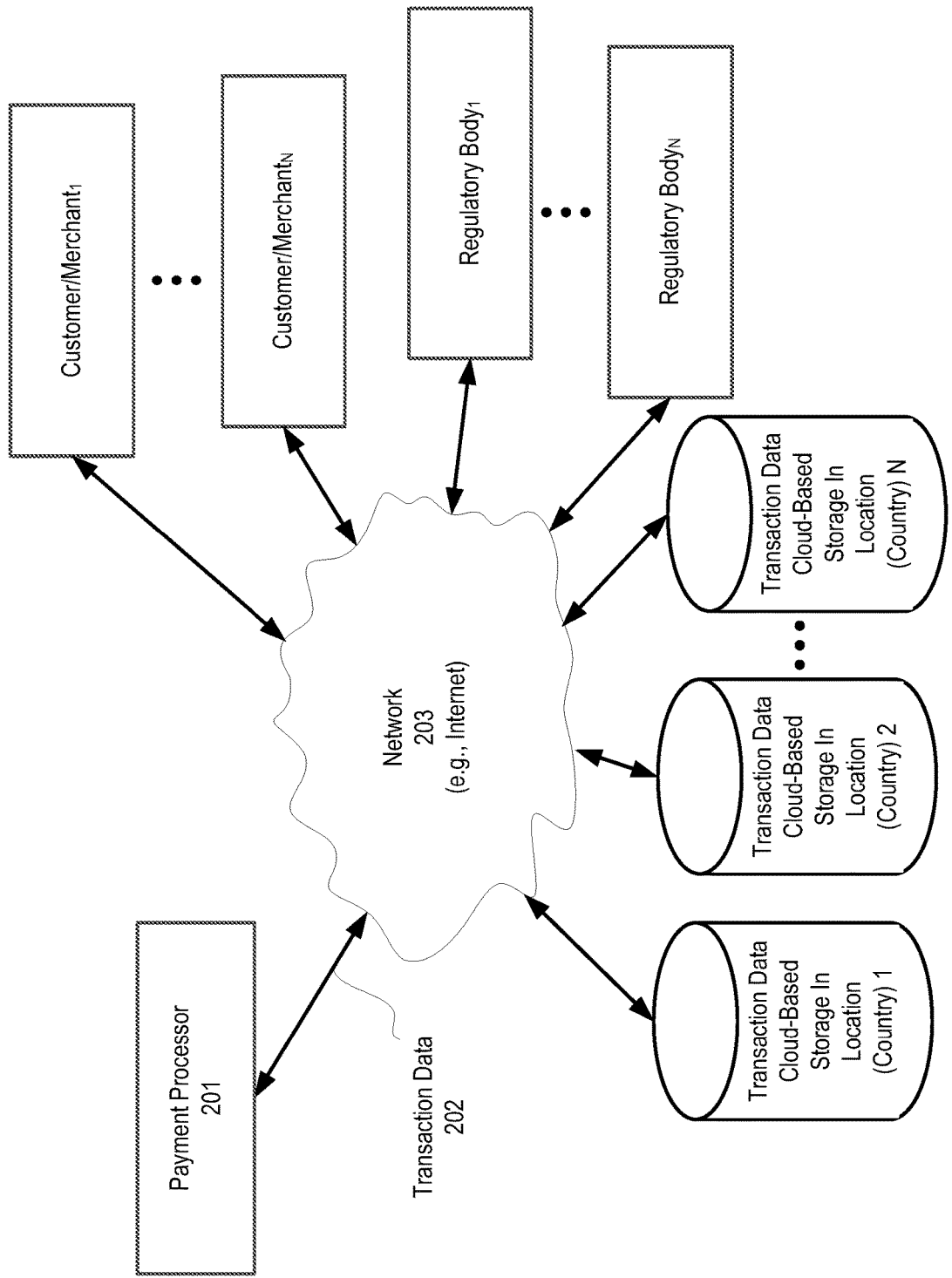
FIG. 2 is a bock diagram of a networked arrangement for cloud-based storage and mirroring of transaction data.

FIG. 2 is a bock diagram of a networked arrangement for cloud-based storage and mirroring of transaction data. Referring to FIG. 2, payment processor 201 sends transaction data related to transactions that are processed, at least in part with the payment processor 201, to cloud-based storage, referred to herein as transaction data cloud-based storage at location 1. In one embodiment, location 1 is in a first country. In one embodiment, the transaction data is sent via network 203 (e.g., the Internet, etc.) for storage in transaction data cloud-based storage at location 1. Transaction data that is stored in transaction data cloud-based storage at location 1 may be accessible to merchants and customers, such as customer/merchants$_1$—customer/merchant$_N$ via network 203.

In one embodiment, a portion or all of the data is mirrored or replicated to one or more other locations such as, for example, transaction data cloud-based storage at location 2 through transaction data cloud-based storage at location N. Each of these other locations is in a country different than the country in which transaction data cloud-based storage at location 1 is located. In one embodiment, the data that is mirrored relates to transactions that occurred in, at least partially, the country in which the transaction data cloud-based storage resides. This enables regulators from regulatory bodies, such as regulatory body1—regulatory bodyN, to gain access to the data to fulfill their obligations as regulators.

In one embodiment, a pipeline is used to support global data mirroring across a heterogeneous set of cloud providers. In one embodiment, the stages of the pipeline are discrete stages and used to mirror the transaction data from transactions that are handled by a payment processor into different countries. In this way, the pipeline acts as a data extraction pipeline that allows the data for merchants in a given country to be extracted from a full set of transaction data in a database and mirrored to the given country in which the merchants reside.

An Exemplary Pipeline

In one embodiment, data mirroring is performed across a heterogeneous set of cloud providers using a pipeline having a plurality of pipeline stages. In one embodiment, these stages are executed by one or more processors in a data processing system.

In one embodiment, the pipeline stages include at least one stage to obtain the data that is to be mirrored and another stage to mirror that data to another location. In one embodiment, the stage that obtains the data that is to be mirrored is referred to herein as the reduce stage of the pipeline, while the stage to mirror the data to another location is referred to herein as a replicate stage.

In one embodiment, a reduce stage in the pipeline filters a set of transaction data stored in a public cloud storage resource (e.g., an s3 bucket). In one embodiment, the filtering occurs according to a configuration file of the public cloud storage resource that specifies filter criteria to create a reduced set of data from the set of transaction data so that data that is associated with each transaction related to a location specified in the filter criteria is obtained. In one embodiment, this reduce stage writes the reduced set of data to a target public cloud storage resource (e.g., a target s3 bucket) specified as an output destination in the configuration file.

FIG. 3A is a block diagram of one embodiment of a data mirroring pipeline that includes a reduce stage and a replicate stage. Referring to FIG. 3A, a transaction data set 301 at one location in a first country (i.e., country 1) is input into reduce stage 310 of a data mirroring pipeline that filters the data according to the location (e.g., the country) in which transactions occur to produce a location-specific (reduced) set of transaction data 302. In one embodiment, this set of data is stored at a location in the first country (country 1).

Figure 4A:
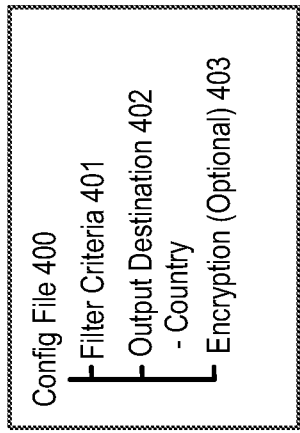
FIG. 4A is a diagram of one embodiment of configuration file for a public cloud storage resource (e.g., bucket).

Replicate stage 311 of the data minoring pipeline receives, or otherwise accesses, location-specific (reduced) set of transaction data 302 and one or more config files 320 and minors the data according to the config files 320 to another location as location-specific (reduced) set of transaction data 303. In one embodiment, the other location is in a country different than the country in which transaction data set 301 is stored. FIG. 4A illustrates an example config file 400 that includes filter criteria 401 that specifies the country (or location) of the transactions for which the data is to be mirrored as well as the output destination to which the data is to be mirrored. In one embodiment, the output destination is a public cloud storage resource (e.g., s3 bucket or similar storage, etc.). Thus, in one embodiment, the input of replicate stage 311 is a set of config files and the reduce dataset buckets defined within the config files, and the output of replicate stage 311 is mirrored data sets copied into the config file-defined remote minor buckets. In one embodiment, the remote cloud-based storage location is in a different country than the country in which the first public cloud storage resource resides.

In one embodiment, and as is described in more detail below, replicate stage 311 encrypts the location-specific (reduced) set of transaction data 302 using encrypting processing logic comprising hardware (e.g., one or more processors, circuitry, dedicated logic, etc.) and/or software. In such a case, in one embodiment, config files 320 specify the encryption policy (e.g., type and/or key to use to encrypt the data) that is to be used with respect to the data that is to be mirrored to another location. An example of such a config file is shown in FIG. 4A.

In one embodiment, replicate stage 311 monitors the target public cloud storage resource that receives data from reduce stage 310 and performs a replication task to mirror the reduced data set to a remote cloud-based storage location defined in the configuration file for the target public cloud storage resource (e.g., a target s3 bucket) when new data is added to the target public cloud storage resource. For example, in the case of the reduced data set is in a first bucket configured for replication (where a configuration file describes a replication pattern(s) of a bucket) and the public cloud storage resource is registered to contain a mirror a subset of the set of transaction data, after filtering during the reduce stage, the subset mirroring is performed in response to an update to the first bucket.

In one embodiment, the plurality of pipeline stages also includes an examination stage to enable access to the mirrored data at the remote cloud-based storage location. This access may be provided in a number of ways. Preferably, the access is through a network-based server system, such as the use of, for example, an FTP server.

FIG. 3B is a block diagram of another embodiment of a data mirroring pipeline that has a reduce stage, a replicate stage and an examination stage. Referring to FIG. 3B, a transaction data set 301 at one location in a first country (i.e., country 1) is input into reduce stage 310 of a data mirroring pipeline that filters the data according to the location (e.g., the country) in which transactions occur to produce a location-specific (reduced) set of transaction data 302. In one embodiment, this set of data is stored at a location in the first country (country 1).

Replicate stage 311 of the data mirroring pipeline receives, or otherwise accesses, location-specific (reduced) set of transaction data 302 and one or more config files 320 and mirrors the data according to the config files 320 to another location as location-specific (reduced) set of transaction data 303. In one embodiment, the other location is in a country different than the country in which transaction data set 301 is stored. In one embodiment, replicate stage 311 encrypts the location-specific (reduced) set of transaction data 302 using encrypting processing logic comprising hardware (e.g., one or more processors, circuitry, dedicated logic, etc.) and/or software.

The pipeline includes an examination stage 312 by which another party, such as, for example, but not limited to, a regulator of a regulatory body. In one embodiment, examination stage 312 decrypts encrypted location-specific (reduced) set of transaction data 302 using decrypting processing logic comprising hardware (e.g., one or more processors, circuitry, dedicated logic, etc.) and/or software. In one embodiment, the decryption occurs at the storage-location. In another embodiment, the decryption occurs at the download location (e.g., the regulatory body).

Additional Reduce Stage Embodiments

In one embodiment, the reduce stage is implemented by extending the configuration file to define a generic set of filter criteria and an output destination for the reduced data set. In one embodiment, the input of the reduce stage is a set of config files and the main dataset containing all the data (e.g., all the transaction data for transaction all over the world), and the output of the reduce stage is the reduced data sets written to the config file defined s3 buckets.

In one embodiment, reduce stage 310 of the pipeline is implemented as a job that runs against the full dataset of transaction data (e.g., transaction data from all countries, transaction data from all jurisdictions, etc.) and filters out a target set of data per criteria (e.g., per country) that is then stored in a public cloud storage resource. In one embodiment, the public cloud storage resource is an s3 bucket, though other public cloud storage resources may be used.

In one embodiment, reduce stage 310 is performed as a regularly occurring batch job. In one embodiment, the regularly occurring batch job is a weekly batch job. Alternatively, the batch job may occur at other regularly occurring time periods (e.g., hourly, a predetermined number of hours, daily, a predetermined number of days, monthly, etc.). Alternatively, reduce stage 310 uses a more frequent batch job that only runs against last N days/hours of full dataset and then writes incremental reduced data set files.

In one embodiment, reduce stage 310 uses a batch driven temporal reduce. In one embodiment, such a batch driven temporal reduce only reads/reduces/emits daily reduced data sets. Thus, instead of having one file with all data for transactions of one country (e.g., all_india_data.json) there would be may individual sets of data that together make up all the data for transactions of the one country (e.g., 10_4_2018_india_data.json).

As an alternative to a batch job, in one embodiment, reduce stage 310 uses a lambda driven incremental reduce stage. In one embodiment, such an implementation monitors the log of transactions and executes the reduce functions on a per transaction basis. In one embodiment, this lambda driven solution appends records to a file (e.g., a journal), and upon reaching a threshold, finalizes the file (e.g., the journal) and writes a file to trigger a replication event.

Figure 4B:
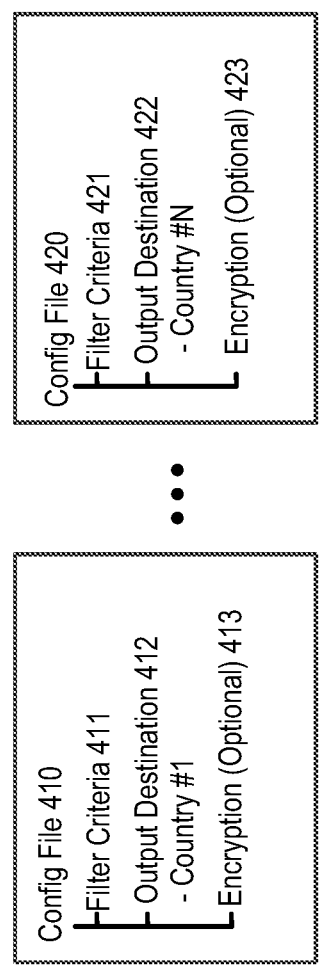
FIG. 4B is a diagram of another embodiment of configuration file for a public cloud storage resource (e.g., bucket).

In one embodiment, reduce stage 310 performs filtering for a number of different locations. Each of these locations are identified in the filter criteria in a config file, causes the filtering of transaction data for that location, and then write the resulting reduced data set for that location to a target public cloud storage resource (e.g., a target s3 bucket). In one embodiment, the locations are identified as reduce predicates in the config file for the public cloud storage resource storing the entire data set that is filtered. An example of a set of configuration files that have different filter criteria that filter for different countries is shown in FIG. 4B where config file 410 includes filter criteria 411 to filter data for transactions for country #1, an output destination or endpoint 412 (e.g., a bucket for the mirrored data), and optionally, encryption policy 413 to specify encryption be used to encrypt the data if encryption is enabled, . . . config file 420 includes filter criteria 421 to filter data for transactions for country #N, an output destination or endpoint 422 (e.g., a bucket for the mirrored data), and optionally, encryption policy 423 to specify encryption be used to encrypt the data if encryption is enabled.

Additional Replicate Stage Embodiments

In one embodiment, replicate stage 320 observes the reduce data set output buckets as defined in the config file and wakes to schedule a replication task whenever a new reduced data set was written by reduce stage 310. In one embodiment, the remote mirror (or set of mirrors) to which the reduced data is to be replicated is defined in the config file. Thus, in one embodiment, replicate stage 320 monitors one or more output buckets and performs a replication task to replicate the reduced data set to a remote cloud-based location defined in a configuration file for the output bucket (s). In one embodiment, this is done by monitoring SQS events related to transactions written into the bucket.

In one embodiment, replication stage 320 is implemented as a cron job that lists and diffs source and mirror target buckets and uses s3 copy to propagate transaction data that is not already replicated and then reads and writes to mirror data to some set of remote locations (e.g., countries).

To support regions that are not covered by one particular cloud provider, support for a public cloud storage resource (e.g., s3) on other cloud providers. For example, if a region does not support a cloud provider like AWS and its use of s3 buckets, for example, other cloud providers such as, for example, Google Compute, AliCloud, etc. could be used as new replication targets.

In one embodiment, when S3 storage is used for remote mirrored data storage, Terraform config files are built that setup multiple remote mirror storage locations, security groups and public cloud storage resource (e.g., s3) targets on various cloud providers. An example of a set of config files is shown in FIG. 4B.

Additional Examination Stage Embodiments

As discussed above, examination stage 312 enables access to the mirrored data at the remote location. In one embodiment, the input of examination stage 312 is the mirrored data set(s) stored in the mirror region storage buckets and the output of examination stage 312 is some form of data examination or extraction for use locally. In other words, in one embodiment, examination stage 312 is a service running in the local region that made the replicated data "available" for some form of examination. In one embodiment, the local use is by local regulators of a local regulatory body.

In one embodiment, examination stage 312 is implemented with a secure FTP access. In another embodiment, the examination stage is implemented using a front end and query-able service. In one embodiment, the mirrored data is repatriated into a database (e.g., an SQL instance) in the mirror region. In this instance, a query front end (FE) (e.g., kibana) is used for data exploration.

Encrypt Data on Replicate/Decrypt on Examine

To secure the data in transit and at rest, in one embodiment, the replicate stage encrypts data as it passes through. Any form of encryption may be used. However, in one embodiment, the encryption is AES or something similar, which is fast and secure.

In one embodiment, the replication stage uses transient symmetric encryption key to encrypt data on egress and the data is replicated to foreign buckets.

In one embodiment, in the case of mirroring to support multi-region replication for failover, data is encrypted as it passes through the pipeline and a "post-replication stage" is added on the remote mirror that decrypted the data. In one embodiment, in the case of mirroring to support data locality, the data remains encrypted in the remote region and decryption is part of examination stage 312.

In one embodiment, a regulatory body access to the data stored locally is via a server that allows the encrypted data to be downloaded and decrypted by the regulatory body using a key that is obtained by the regulatory body via a key exchange. In one embodiment, the service is an sFTP server that allows regulators to download the data.

Figure 5:
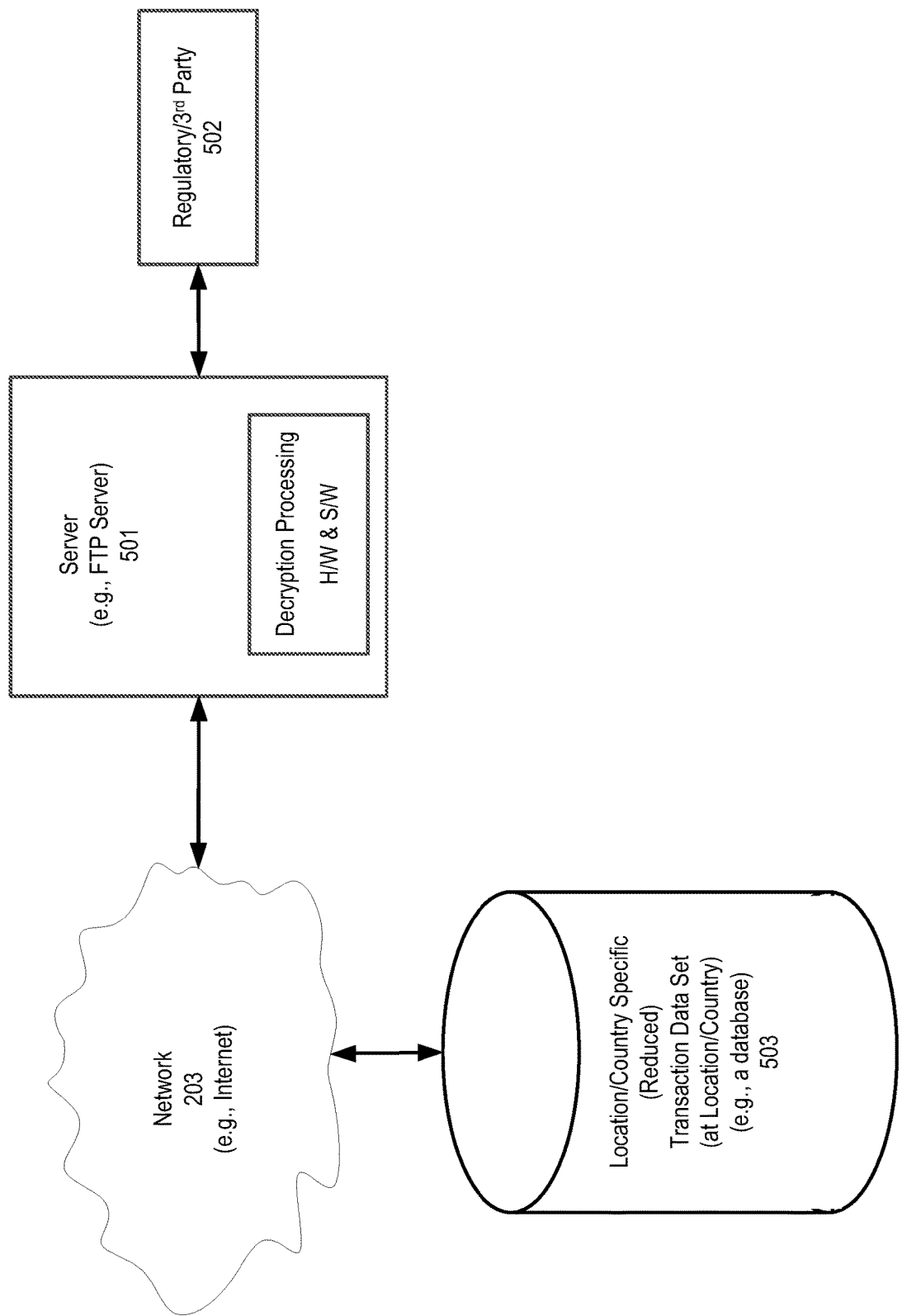
FIG. 5 illustrates an example of server access to a location-specific set of transaction data.

For example, in one embodiment, a secure FTP (sFTP) server is used to access the local, encrypted data and individuals (e.g., foreign government individuals) are allowed to download their sovereign data via the sFTP server. The sFTP server decrypts the data as it was downloaded. FIG. 5 illustrates an example of server access to a location-specific set of transaction data. Referring to FIG. 5, a server 501 (e.g., FTP server) accesses location/country-specific (reduced) transaction data storage 503, via network 302 (e.g., the Internet) on behalf of a party (e.g., regulatory body) 502. In this embodiment, server 501 includes decryption processing hardware (e.g., one or more processors, circuitry, dedicated logic, etc.) and/or software to perform the decryption on the data downloaded from location/country-specific (reduced) transaction data storage 503.

To make the decryption key available for decryption, a key ceremony or other side channel technique may be used to share a decryption key for decrypting the data with a party (e.g., a foreign government or regulatory body) and the data remains encrypted at every stage in the data mirroring pipeline. For example, a key exchange may be performed with a regulatory entity that has access to the mirrored data.

In one embodiment, after decrypting a current set of data, the decryption key is discarded as the data in the future is encrypted with a different key. This provides for perfect forward secrecy.

Data Transfer for Replication

In one embodiment, the transfer of data to the other locations (e.g., countries) is performed using HTTP post or Remote Copy Protocol (RCP), Secure Copy Protocol (SCP), and/or File Transfer Protocol (FTP).

To reduce costs, increase reliability (e.g., lower error rates) and increase speed of replicating large amounts of data across long haul links, data movement mechanics like an HTTP post start to become flaky and very slow due to insufficient wire parallelism and TCP backoff, alternative data transfer techniques may be used. In one embodiment, the transfer of the data is performed using a parallel chunking style copy that divides large files into many pieces and tries to copy many of them in parallel. In one embodiment, the parallel transfer is accomplished using parallel Rsync. In another embodiment, the parallel transfer is accomplished using Bittorrent. Note that other parallel data transfer techniques may be used.

FIG. 6 is a flow diagram of one embodiment of a process for mirroring data in a global environment. The process is performed by processing logic that comprises hardware (circuitry, dedicated logic, etc.), software (e.g., software running on a chip), firmware, or a combination of the three. While the payment processing system is shown as one system, in one embodiment, the payment processing system is implemented with more than one system (e.g., a plurality of processing devices, servers, computer systems, etc.).

Referring to FIG. 6, the process begins by processing logic capturing a set of transaction data associated with payment processing transactions into a first public cloud storage resource (processing block 601). In one embodiment, this is performed by a payment processor (e.g., Stripe) in a manner well-known in the art.

Next, processing logic performs data mirroring across a heterogeneous set of cloud providers using a pipeline having a plurality of pipeline stages executed by one or more processors, where the pipeline stages include: a first stage to filter a set of transaction data stored in the first public cloud storage resource according to a configuration file of the first public cloud storage resource that specifies filter criteria to create a reduced set of data, from the set of transaction data, that contains data associated with each transaction related to a location specified in the filter criteria and to write the reduced set of data to a target public cloud storage resource specified as an output destination in the configuration file at the location; and a replication stage to monitor the target public cloud storage resource and perform a replication task to mirror the reduced data set to a remote cloud-based storage location defined in the configuration file for the target public cloud storage resource, including encrypting data prior to mirroring of the data to the remote cloud-based storage location according to an encryption policy in the configuration file of the target public cloud storage resource and performing a key exchange with another party (e.g., regulatory entity) for decryption, where the remote cloud-based storage location is in a first country different than a second country in which the first public cloud storage resource resides; and an examination stage to enable access to the mirrored data at the remote cloud-based storage location, including optionally providing secure server (e.g., FTP server) access to the mirrored data and decrypting encrypted transaction data (processing block 602).

In one embodiment, the replication stage of processing block 602 wakes to perform the replication task in response to new data being written to the public cloud storage resource (e.g., the bucket storing the full set of transaction data from which data is to be mirrored). In one embodiment, the replication stage wakes by in response to monitoring message queuing service events related to transactions written into the public cloud storage resource.

In one embodiment, the replication stage of processing block 602 encrypts data prior to mirroring of the data to the remote cloud-based storage location according to an encryption policy in the configuration file of the target public cloud storage resource.

In one embodiment, processing block 602 includes performing a key exchange with a regulatory entity that has access to data in the remote cloud-based storage location, the key exchange to provide a key for decrypting data in the remote cloud-based storage location.

In one embodiment, the pipeline of processing block 602 comprises an examination stage to enable access to the mirrored data at the remote cloud-based storage location. In one embodiment, the access is secure FTP access via an FTP server and the FTP server is operable to decrypt the data as the data is being downloaded.

In one embodiment, execution of the first stage and the replicate stage of the pipeline of processing block 602 is driven by a cron job.

Figure 7:
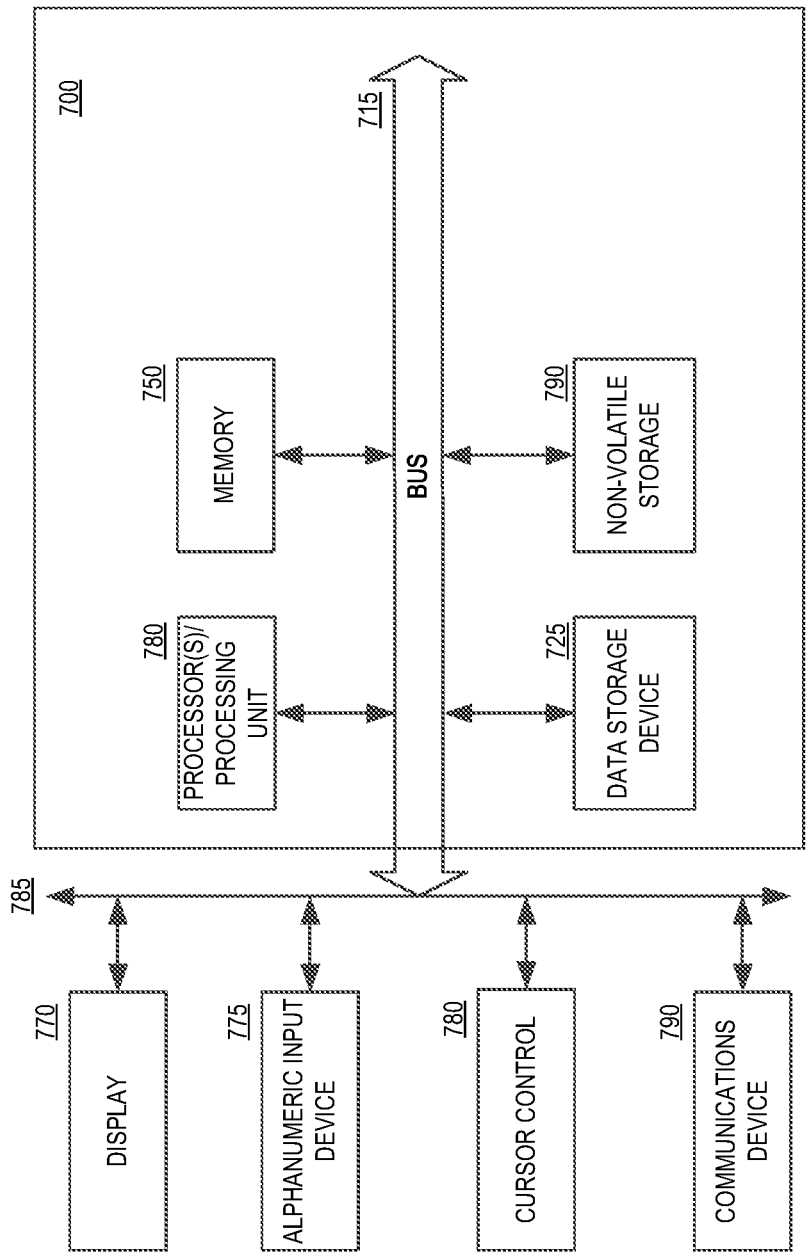
FIG. 7 is a block diagram of one embodiment of a computer system.

FIG. 7 is one embodiment of a computer system that may be used to support the systems and operations discussed herein. It will be apparent to those of ordinary skill in the art, however that other alternative systems of various system architectures may also be used.

The data processing system illustrated in FIG. 7 includes a bus or other internal communication means 715 for communicating information, and a processor(s) 710 coupled to the bus 715 for processing information. The system further comprises a random-access memory (RAM) or other volatile storage device 750 (referred to as memory), coupled to bus 715 for storing information and instructions to be executed by processor 710. Main memory 750 also may be used for storing temporary variables or other intermediate information during execution of instructions by processor(s) 710. The system also comprises a read only memory (ROM) and/or static storage device 720 coupled to bus 715 for storing static information and instructions for processor 710, and a data storage device 725 such as a magnetic disk or optical disk and its corresponding disk drive. Data storage device 725 is coupled to bus 715 for storing information and instructions.

The system may further be coupled to a display device 770, such as a light emitting diode (LED) display or a liquid crystal display (LCD) coupled to bus 715 through bus 765 for displaying information to a computer user. An alphanumeric input device 775, including alphanumeric and other keys, may also be coupled to bus 715 through bus 765 for communicating information and command selections to processor 710. An additional user input device is cursor control device 780, such as a touchpad, mouse, a trackball, stylus, or cursor direction keys coupled to bus 715 through bus 765 for communicating direction information and command selections to processor 710, and for controlling cursor movement on display device 770.

Another device, which may optionally be coupled to computer system 700, is a communication device 790 for accessing other nodes of a distributed system via a network. The communication device 790 may include any of a number of commercially available networking peripheral devices such as those used for coupling to an Ethernet, token ring, Internet, or wide area network. The communication device 790 may further be a null-modem connection, or any other mechanism that provides connectivity between the computer system 700 and the outside world. Note that any or all of the components of this system illustrated in FIG. 7 and associated hardware may be used in various embodiments as discussed herein.

In one embodiment, processor(s) 710 executes stages of the data mirroring pipeline (e.g., the reduce stage, replication stage, etc.) and uses its communication device 790 to send the data, or have it sent, to output destinations (e.g., public cloud storage resources, etc.) to complete the data replication.

It will be appreciated by those of ordinary skill in the art that any configuration of the system may be used for various purposes according to the particular implementation. The control logic or software implementing the described embodiments can be stored in main memory 750, mass storage device 725, or other storage medium locally or remotely accessible to processor 710.

It will be apparent to those of ordinary skill in the art that the system, method, and process described herein can be implemented as software stored in main memory 750 or read only memory 720 and executed by processor 710. This control logic or software may also be resident on an article of manufacture comprising a computer readable medium having computer readable program code embodied therein and being readable by the mass storage device 725 and for causing the processor 710 to operate in accordance with the methods and teachings herein.

The embodiments discussed herein may also be embodied in a handheld or portable device containing a subset of the computer hardware components described above. For example, the handheld device may be configured to contain only the bus 785, the processor 710, and memory 750 and/or 725. The handheld device may also be configured to include a set of buttons or input signaling components with which a user may select from a set of available options. The handheld device may also be configured to include an output apparatus such as a liquid crystal display (LCD) or display element matrix for displaying information to a user of the handheld device. Conventional methods may be used to implement such a handheld device. The implementation of embodiments for such a device would be apparent to one of ordinary skill in the art given the disclosure as provided herein.

The embodiments discussed herein may also be embodied in a special purpose appliance including a subset of the computer hardware components described above. For example, the appliance may include a processor 710, a data storage device 725, a bus 715, and memory 750, and only rudimentary communications mechanisms, such as a small touch-screen that permits the user to communicate in a basic manner with the device. In general, the more special-purpose the device is, the fewer of the elements need be present for the device to function.

There is a number of example embodiments described herein.

Example 1 is a method for implementing country-specific data locality to cause data related to local transactions to be stored within the country in which the transactions occurred, where the method comprises: capturing a set of transaction data associated with payment processing transactions into a first public cloud storage resource; and performing data mirroring across a heterogeneous set of cloud providers using a pipeline having a plurality of pipeline stages executed by one or more processors, the plurality of pipeline stages including a first stage to filter a set of transaction data stored in the first public cloud storage resource according to a configuration file of the first public cloud storage resource that specifies filter criteria to create a reduced set of data, from the set of transaction data, that contains data associated with each transaction related to a location specified in the filter criteria and to write the reduced set of data to a target public cloud storage resource specified as an output destination in the configuration file at the location; and a replication stage to monitor the target public cloud storage resource and perform a replication task to mirror the reduced data set to a remote cloud-based storage location defined in the configuration file for the target public cloud storage resource, the remote cloud-based storage location being in a first country different than a second country in which the first public cloud storage resource resides.

Example 2 is the method of example 1 that may optionally include that the replication stage wakes to perform the replication task in response to new data being written to the target public cloud storage resource.

Example 3 is the method of example 1 that may optionally include monitoring message queuing service events related to transactions written into the first public cloud storage resource.

Example 4 is the method of example 1 that may optionally include that the replication stage is operable to encrypt data prior to mirroring of the data to the remote cloud-based storage location according to an encryption policy in the configuration file of the target public cloud storage resource.

Example 5 is the method of example 4 that may optionally include performing a key exchange with a regulatory entity that has access to data in the remote cloud-based storage location, the key exchange to provide a key for decrypting data in the remote cloud-based storage location.

Example 6 is the method of example 1 that may optionally include that the plurality of pipeline stages comprises an examination stage to enable access to the mirrored data at the remote cloud-based storage location.

Example 7 is the method of example 6 that may optionally include that the access is secure FTP access via an FTP server.

Example 8 is the method of example 7 that may optionally include that the FTP server is operable to decrypt the data as the data is being downloaded.

Example 9 is the method of example 1 that may optionally include that execution of the first stage and the replication stage is driven by a cron job.

Example 10 is the method of example 1 that may optionally include that the replication stage is operable to perform replication by copying chucks of the data in the target public cloud storage resource in parallel to the remote cloud-based storage location.

Example 11 is a payment processing system to process transactions of a plurality of merchants, where the payment processing system comprises: a network interface; a memory to store instructions; one or more processors coupled to the memory and the network interface to execute the stored instructions to: capture a set of transaction data associated with payment processing transactions into a first public cloud storage resource via the network interface; and perform data mirroring across a heterogeneous set of cloud providers using a pipeline having a plurality of pipeline stages executed by one or more processors, the plurality of pipeline stages including a first stage to filter a set of transaction data stored in the first public cloud storage resource according to a configuration file of the first public cloud storage resource that specifies filter criteria to create a reduced set of data from the set of transaction data that contains data associated with each transaction related to a location specified in the filter criteria and to write the reduced set of data to a target public cloud storage resource specified in the configuration file as an output destination at the location; and a replication stage to monitor the target public cloud storage resource and perform a replication task to mirror the reduced data set to a remote cloud-based storage location defined in the configuration file for the target public cloud storage resource, the remote cloud-based storage location being in a first country different than a second country in which the first public cloud storage resource resides.

Example 12 is the system of example 11 that may optionally include that the replication stage wakes to perform the replication task in response to new data being written to the target public cloud storage resource.

Example 13 is the system of example 11 that may optionally include that the one or more processors is operable to monitor message queuing service events related to transactions written into the first public cloud storage resource.

Example 14 is the system of example 11 that may optionally include that the replication stage is operable to encrypt data prior to mirroring of the data to the remote cloud-based storage location according to an encryption policy in the configuration file of the target public cloud storage resource.

Example 15 is the system of example 14 that may optionally include that the one or more processors is operable to perform a key exchange with a regulatory entity that has access to data in the remote cloud-based storage location, the key exchange to provide a key for decrypting data in the remote cloud-based storage location.

Example 16 is the system of example 11 that may optionally include that the plurality of pipeline stages comprises an examination stage to enable access to the mirrored data at the remote cloud-based storage location.

Example 17 is the system of example 16 that may optionally include that the access is secure FTP access via an FTP server.

Example 18 is the system of example 17 that may optionally include that the FTP server is operable to decrypt the data as the data is being downloaded.

Example 18 is the system of example 11 that may optionally include that execution of the first stage and the replication stage is driven by a cron job.

Example 20 is the system of example 11 that may optionally include that the replication stage is operable to perform replication by copying chucks of the data in the target public cloud storage resource in parallel to the remote cloud-based storage location.

Example 21 is one or more non-transitory computer readable storage media having instructions stored thereupon which, when executed by a payment processing system having at least a processor and a memory therein, cause the payment processing system to perform operations comprising: capturing a set of transaction data associated with payment processing transactions into a first public cloud storage resource; and performing data mirroring across a heterogeneous set of cloud providers using a pipeline having a plurality of pipeline stages executed by one or more processors, the plurality of pipeline stages including a first stage to filter a set of transaction data stored in the first public cloud storage resource according to a configuration file of the first public cloud storage resource that specifies filter criteria to create a reduced set of data from the set of transaction data that contains data associated with each transaction related to a location specified in the filter criteria and to write the reduced set of data to a target public cloud storage resource specified in the configuration file as an output destination at the location; and a replication stage to monitor the target public cloud storage resource and perform a replication task to mirror the reduced data set to a remote cloud-based storage location defined in the configuration file for the target public cloud storage resource, the remote cloud-based storage location being in a first country different than a second country in which the first public cloud storage resource resides.

Example 22 is the media of example 21 that may optionally include that the replication stage wakes to perform the replication task in response to new data being written to the target public cloud storage resource.

Example 23 is the media of example 21 that may optionally include that the method further comprises monitoring message queuing service events related to transactions written into the first public cloud storage resource.

Example 24 is the media of example 21 that may optionally include that the replication stage is operable to encrypt data prior to mirroring of the data to the remote cloud-based storage location according to an encryption policy in the configuration file of the target public cloud storage resource, and the method further comprises performing a key exchange with a regulatory entity that has access to data in the remote cloud-based storage location, the key exchange to provide a key for decrypting data in the remote cloud-based storage location.

Example 25 is the media of example 21 that may optionally include that execution of the first stage and the replication stage is driven by a cron job.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

We claim:

1. A method comprising:
   capturing a set of transaction data associated with a set of transactions into a first cloud-based storage resource associated with a first cloud-based storage provider;
   determining that the first cloud-based storage resource resides in a first location and is unavailable for use in a second location, different than the first location, and that a second cloud-based storage resource, associated with a second cloud-based storage provider, is available for use in the second location;
   creating a configuration file in the first cloud-based storage resource, the configuration file comprising: a set of filter criteria to reduce the set of transaction data to a location-specific subset of transaction data, a target destination in the second cloud-based storage resource, and an encryption policy to encrypt the location-specific subset of transaction data; and
   mirroring data across a heterogeneous set of cloud-based storage providers using a plurality of stages executed by one or more processors, the heterogeneous set of cloud-based storage providers comprising the first cloud-based storage provider and the second cloud-based storage provider, the mirroring comprising:
   filtering, at a reduction stage, according to the configuration file, the set of transaction data and writing the location-specific subset of transaction data to the target destination; and
   monitoring, at a replication stage, the second cloud-based storage resource and, in response to new location-specific data of the location-specific subset of transaction data being added to the second cloud-based storage resource from the reduction stage, performing a replication task to mirror the location-specific subset of transaction data, in accordance with the encryption policy, to the target destination defined in the configuration file.

2. The method of claim 1, wherein the replication stage wakes to perform the replication task as a result of new data being written to the second cloud-based storage resource.

3. The method of claim 1, further comprising monitoring message queuing service events related to transactions written into the first cloud-based storage resource.

4. The method of claim 1, wherein the replication stage performs encryption of the location-specific subset of transaction data, in accordance with the encryption policy, prior to mirroring the location-specific subset of transaction data to the target destination.

5. The method of claim 1, wherein the plurality of stages further comprise an examination stage to enable access to the mirrored data at the target destination.

6. The method of claim 1, wherein filtering at the reduction stage and execution of the replication stage are performed by a cron job.

7. The method of claim 1, wherein the replication stage is operable to perform replication by copying, in parallel, chunks of the data in the first cloud-based storage resource to the target destination.

8. The method of claim 1, wherein the set of transactions comprises a set of payment processing transactions.

9. The method of claim 1, wherein the set of filter criteria reduce the set of transaction to the location-specific subset of transaction data to satisfy one or more regulatory requirements.

10. The method of claim 1, wherein the plurality of stages comprise a pipeline of sequential operations performed by the plurality of stages.

11. A system comprising:
    a memory to store instructions; and
    one or more processors coupled to the memory to execute the stored instructions to:
    capture a set of transaction data associated with a set of transactions into a first cloud-based storage resource associated with a first cloud-based storage provider;
    determine that the first cloud-based storage resource resides in a first location and is unavailable for use in a second location, different than the first location, and that a second cloud-based storage resource, associated with a second cloud-based storage provider, is available for use in the second location;
    create a configuration file in the first cloud-based storage resource, the configuration file comprising:
    a set of filter criteria to reduce the set of transaction data to a location-specific subset of transaction data that satisfies regulatory requirements;
    a target destination in the second cloud-based storage resource; and
    an encryption policy to encrypt the location-specific subset of transaction data; and mirror data across a heterogeneous set of cloud-based storage providers using a plurality of stages executed by one or more processors, the heterogeneous set of cloud-based storage providers comprising the first cloud-based storage provider and the second cloud-based storage provider, the mirroring further to:

filter, at a reduction stage, according to the configuration file, the set of transaction data and writing the location-specific subset of data to the target destination; and monitor, at a replication stage, the second cloud-based storage resource and, in response to new location-specific data of the location-specific subset of transaction data being added to the second cloud-based storage resource from the reduction stage, automatically performing a replication task to mirror the location-specific subset of transaction data, in accordance with the encryption policy, to the target destination defined in the configuration file.

12. The system defined in claim 11, wherein the replication stage wakes to perform the replication task as a result of new data being written to the second cloud-based storage resource.

13. The system defined in claim 11, wherein the one or more processors are operable to monitor message queuing service events related to the set of transactions written into the first cloud-based storage resource.

14. The system defined in claim 11, wherein the replication stage is operable to encrypt the location-specific subset of transaction data, in accordance with the encryption policy, prior to mirroring the location-specific subset of transaction data to the target destination.

15. The system defined in claim 11, wherein the plurality of stages comprises an examination stage to enable access to the mirrored data at the target destination.

16. The system defined in claim 11, wherein filtering at the reduction stage and execution of the replication stage are performed by a cron job.

17. The system defined in claim 11, wherein the replication stage is operable to perform replication by copying, in parallel, chunks of the data in the first cloud-based storage resource to the target destination.

18. A non-transitory computer readable storage media having instructions stored thereupon which, when executed by at least a processor and a memory cause the processor and the memory to perform operations comprising:

capturing a set of transaction data associated with a set of transactions into a first cloud-based storage resource associated with a first cloud-based storage provider;

determining that the first cloud-based storage resource resides in a first location and is unavailable for use in a second location, different than the first location, and that a second cloud-based storage resource, associated with a second cloud-based storage provider, is available for use in the second location;

creating a configuration file in the first cloud-based storage resource, the configuration file comprising:

a set of filter criteria to reduce the set of transaction data to a location-specific subset of transaction data that satisfies regulatory requirements;

a target destination in the second cloud-based storage resource; and an encryption policy to encrypt the location-specific subset of transaction data; and mirroring data across a heterogeneous set of cloud-based storage providers using a plurality of stages executed by one or more processors, the heterogeneous set of cloud-based storage providers comprising the first cloud-based storage provider and the second cloud-based storage provider, the mirroring including:

filtering, at a reduction stage, according to the configuration file, the set of transaction data and writing the location-specific subset of transaction data to the target destination; and monitoring, at a replication stage, the second cloud-based storage resource and, in response to new location-specific data of the location-specific subset of transaction data being added to the second cloud-based storage resource from the reduction stage, automatically performing a replication task to mirror the location-specific subset of transaction data, in accordance with the encryption policy, to the target destination defined in the configuration file.

19. The non-transitory computer readable storage media of claim 18, wherein the replication stage wakes to perform the replication task as a result of new data being written to the second cloud-based storage resource.

20. The non-transitory computer readable storage media of claim 18, wherein the operations further comprise monitoring message queuing service events related to the set of transactions written into the first cloud-based storage resource.

* * * * *